United States Patent [19]

Moore, III

[11] 3,887,901

[45] June 3, 1975

[54] LONGITUDINAL PARITY GENERATOR FOR MAINFRAME MEMORIES

[75] Inventor: Harry Winthrop Moore, III, Lakeland, Minn.

[73] Assignee: Sperry Rand Corporation, New York, N.Y.

[22] Filed: Apr. 29, 1974

[21] Appl. No.: 465,014

[52] U.S. Cl. ........................................ 340/146.1 AG
[51] Int. Cl. .............................................. G06f 11/10
[58] Field of Search. 340/146.1, 146.1 AG, 146.1 R

[56] References Cited

UNITED STATES PATENTS

| | | | |
|---|---|---|---|
| 3,075,175 | 1/1963 | Lourie | 340/146.1 AG |
| 3,183,483 | 5/1965 | Losowski | 340/146.1 AG |
| 3,566,093 | 2/1971 | Joyce | 340/146.1 AG |

*Primary Examiner*—Charles E. Atkinson
*Attorney, Agent, or Firm*—Thomas J. Nikolai; Kenneth T. Grace; Marshall M. Truex

[57] ABSTRACT

A network for continuously generating a longitudinal parity word for the main memory of a digital computer as new data is entered therein. The network includes a register having a number of stages equal to the word size of the memory, for storing the instantaneous value of the longitudinal word, plural Exclusive OR circuits connected individually to the input of each of the stages and having a first input of each connected to the output of the corresponding parity register stage and a second input of each Exclusive OR circuit adapted to be selectively connected alternately to the output of individual stages of either the memory write data register or its output register.

3 Claims, 2 Drawing Figures

LONGITUDINAL PARITY GENERATOR FOR MAINFRAME MEMORIES

BACKGROUND OF THE INVENTION

A rather well known method for detecting the occurrence of errors in digital data processing and digital transmission systems involves the use of the so-called "parity checking" technique. In general, an additional bit position is assigned to each word of data and that bit is set to a binary "1" or "0" such that the total number of 1-bits in the composite word will be odd or even, depending upon the convention used. Assuming that an odd parity convention is employed, when the word is transmitted from a source to a destination, a check is made to determine whether the number of 1-bits is still odd. If the check reveals that the transmitted word includes an even number of 1-bits, it is known that an error has occurred in the transmission.

For a fuller understanding of parity checking and its application to a magnetic tape storage system, reference is made to the Lisowski U.S. Pat. No. 3,183,483. As is set forth in the Lisowski patent, a higher degree of error checking can be accomplished by not only applying parity checking techniques to individual words, but also by applying the technique to a series of words stored serially on a magnetic tape. This last mentioned technique is the so-called "longitudinal" parity checking. By using both horizontal and longitudinal parity checking, a higher degree of error detection can be accomplished and in many instances error correction becomes feasible.

While longitudinal parity checking has found application in magnetic tape and punched paper tape devices which are commonly considered peripheral equipment in an electronic data processing system, only horizontal parity checking has found application with the information stored in the main memory of the computer.

The present invention provides a novel arrangement for generating longitudinal parity for the plural words stored in a computer mainframe memory. As such, it is applicable to magnetic core memories, plated wire memories, semiconductor memories and, in fact, to any type of memory where a read operation may be performed in advance of any write operation. By combining longitudinal parity and horizontal parity checking in a computer mainframe memory, it becomes easier to identify the failing bit when a memory problem occurs, and therefore allows for error correction. The preferred embodiment described herein operates efficiently in that it does not significantly increase the normal memory cycle time nor does it normally require program intervention.

SUMMARY OF THE INVENTION

In the preferred embodiment of the present invention there is provided a parity register in which is temporarily stored the instantaneous parity word for the data stored in the computer memory. For each stage in the parity register there is associated an Exclusive OR gate having its output connected to the input of that stage and a first input connected to the output of that stage. A second input of each of the plural Exclusive OR gates is adapted to be alternately connected through a selection network to either the memory output register or to the memory write data register.

In the memory system with which the present invention finds use, the write cycle is comprised of first and second phases. During phase 1, the current contents of memory address where the new information is to be stored is first read out and temporarily stored in the memory output register. During phase 2, the new word is written into the addressed memory register from the "Write Data Register." When the current contents of the parity register are first Exclusively ORed with the old word read out during phase 1 of the memory cycle and the resulting parity word is subsequently Exclusively ORed with the new word in the Write Data Register, the result remaining in the parity register will be a longitudinal parity word for the entire new contents of the memory.

OBJECTS

It is accordingly an object of the present invention to provide a novel parity word generator for a computer mainframe memory.

Another object of the invention is to provide a digital logic network which continuously generates a longitudinal parity word for the contents of a computer memory each time a change is made in the contents of said memory.

A still further object of the invention is to provide a longitudinal parity word generator for a computer mainframe memory which does not significantly increase the normal memory cycle time nor require program intervention to compute the parity word.

These and other objects and advantages of the invention will become apparent to those skilled in the art upon a reading of the following detailed description considered in conjunction with the accompanying drawings in which:

DETAILED DESCRIPTION

Figures 1, 2:
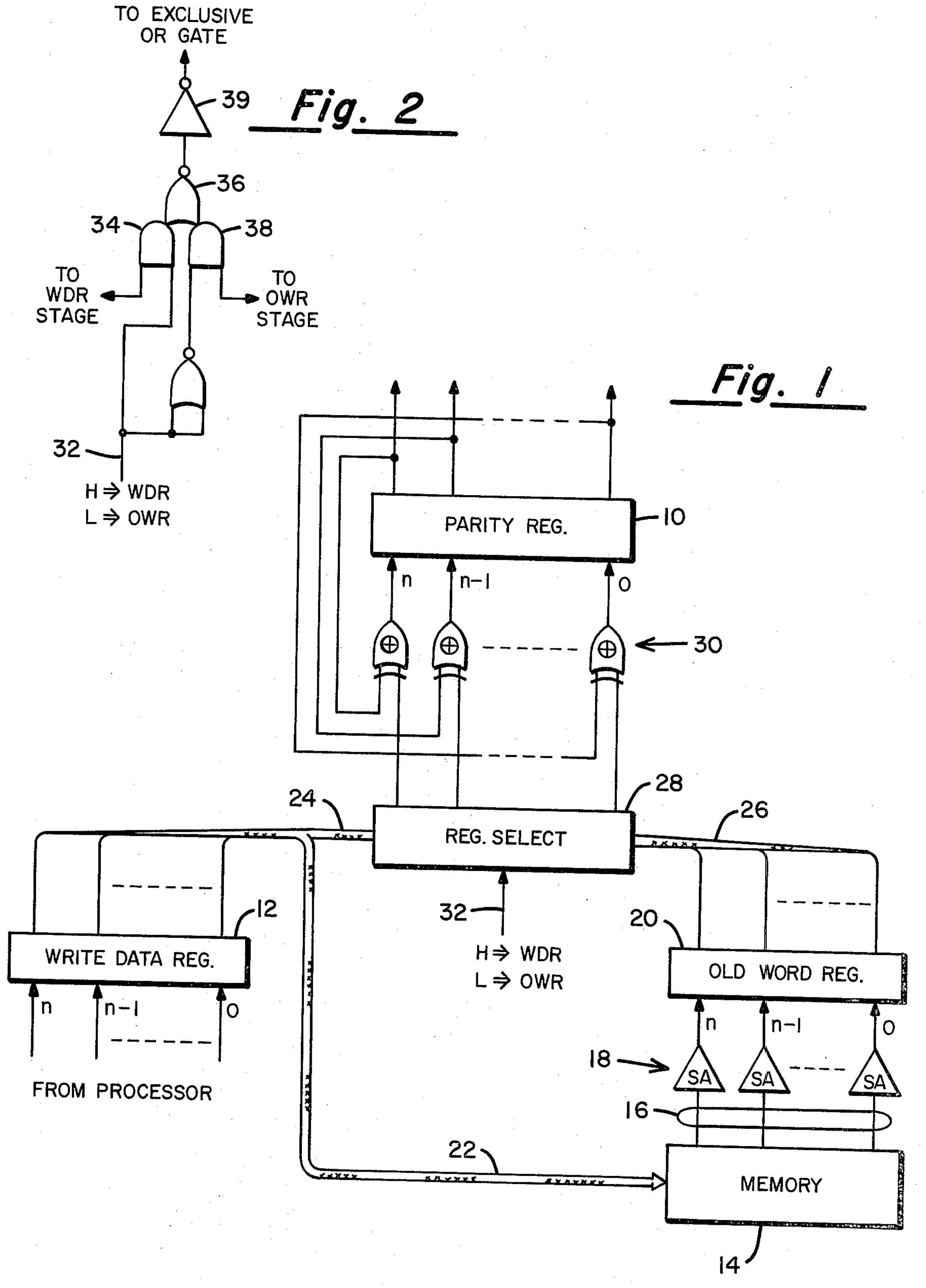
FIG. 1 is a block diagram of the logic network for the preferred embodiment of the invention.
FIG. 2 illustrates a typical stage of the Register Select network illustrated in FIG. 1.

Referring first to FIG. 1, there is shown a logic diagram of the preferred embodiment of the present invention. As was mentioned in the introductory portion of this specification, the purpose of the invention is to continuously generate a parity word for all of the words stored in a computer memory such that when the individual bits of the parity word are added to the bits occupying a corresponding position in the computer memory, the resultant total will be odd or even depending upon the designers' wishes. The continuously generated parity word is adapted to be stored in a multistage register 10, termed the Parity Register which may be comprised of a plurality of interconnected bistable circuits. Also included in the apparatus of FIG. 1 is a multistage Write Data Register 12 which is adapted to temporarily hold words which are to be entered into the memory of the computer from an external source such as a processor or a piece of computer peripheral equipment.

In FIG. 1, the memory itself is represented by a block identified by numeral 14 and may take any one of a number of possible forms. For example, the memory 14 may be a coincident current magnetic core memory comprised of a plurality of word registers. Alternatively, the memory 14 may be a semiconductor integrated circuit structure now finding wide use in digital computing equipment. The only requirement for memory 14 is that in writing a new word of information at any given address, a read operation precedes the write operation. Since the addressing circuitry for the memory is not directly involved with the operation of the longitudinal parity word generating circuitry of this invention, it has not been illustrated. It should be understood, however, that circuitry is provided for accessing any one of the plural word registers stored in the memory 14. The read-out signals from the memory 14 appear on the sense lines 16 and are coupled through sense amplifiers 18 to a memory output register 20 herein termed the "Old Word Register." Thus, when a particular address in the memory 14 is accessed during a read or a write operation, the various bits comprising the data word stored at that address are applied via the sense amplifiers 18 to corresponding ordered stages of the Old Word Register 20. During the write cycle, the new information to be entered into a particular address in the memory 14 are conveyed over cable 22 from the Write Data Register 12.

The outputs from the individual stages of the Write Data Register 12 and the Old Word Register 20 are applied via cables 24 and 26 to a register select network 28. The outputs from the register select network 28 are individually connected to a first input of a plurality of Exclusive OR gates 30 which are individually associated with the plural stages of the Parity Register 10. Thus, when the control signal applied to the register select network 28 is of a first binary significance, the contents of the Write Register 12 will be connected via the select network 28 to the Exclusive OR circuits 30 whereas if the control signal applied to the register select network 28 is of the opposite binary significance, the contents of the Old Word Register 20 will be applied to the Exclusive OR gates 30.

As is illustrated, the individual outputs of the Exclusive OR gates 30 are connected to corresponding stages of the Parity Register 10. The second input to a given Exclusive OR gate is connected to receive the output from its associated stage of the Parity Register 10. Hence, the Exclusive OR gate 30 associated with stage 0 of the Parity Register 10 compares the binary value stored in stage 0 with the binary value stored in stage 0 of either the Write Data Register 12 or the Old Word Register 20 depending upon the setting of the register select network 28. In a similar fashion, the Exclusive OR gate associated with stage *n* of the Parity Register 10 compares the binary value stored in stage *n* with that stored in stage *n* of either the Write Data Register 12 or the Old Word Register 20.

FIG. 2 illustrates one arrangement for implementing a single stage of the register select network 28. A similar configuration of logic elements is provided for each stage of the Parity Register 10 or the registers 12 and 20. When the signal applied to the control terminal 32 is high, AND gate 34 will be partially enabled to transfer the binary value stored in a given stage of the Write Data Register 12 through the NOR circuit 36 and inverter 39 to an associated Exclusive OR gate 30. On the other hand, if the control signal applied to the terminal 32 is low, gate 34 will be disabled, but AND gate 38 will be partially enabled to transfer the binary value stored in a given stage of the Old Word Register through the NOR circuit 36 and inverter 39 to a first terminal of an associated Exclusive OR network 30.

Now that the details of the construction of the preferred embodiment have been presented, consideration will next be given to its mode of operation.

OPERATION

In explaining the operation of the preferred embodiment, a series of examples will be presented. Let it first be assumed that the memory word size is 6-bits and that the memory capacity is four words. It should be recognized, however, that this choice is totally arbitrary and the present invention can be expanded to handle any given word size and any given capacity. Further let it be assumed that the memory 14 is initially cleared, i.e., a binary zero is stored in each bit position of every word in the memory which is the case prior to the initial loading of the memory. The following examples will then show the manner in which the contents of the parity register change upon the entry of new information into the memory. Finally, an example will be given showing the manner in which the contents of the Parity Register change when an existing word in the memory is replaced by a new word.

With the assumed conditions prevailing prior to the initial loading, the information stored in the memory and the associated Parity Register 10 is as follows:

| ADDRESS | DATA |
|---|---|
| $\alpha$ | 0 0 0 0 0 0 |
| $\alpha+1$ | 0 0 0 0 0 0 |
| $\alpha+2$ | 0 0 0 0 0 0 |
| $\alpha+3$ | 0 0 0 0 0 0 |
| Parity Register | 1 1 1 1 1 1 |

The foregoing assumes that a system of odd parity is to be employed. If even parity had been selected, the initial contents of the Parity Register 10 would have been all zeros.

Now assume that the memory is to be loaded from an external unit such as a processor, a magnetic tape unit or a punched card reader and that the first word to be entered at address, $\alpha$, is 010101. In operation, the word to be written into the memory is entered into the Write Data Register 12 from the external unit. The memory is cycled and during phase 1 of the cycle, the old word stored at address $\alpha$, i.e., 000000 is entered into the Old Word Register 20. With a low control signal applied to the register select network 28, the word stored in the Old Word Register 20 will be Exclusively ORed with the current content of the Parity Register 10 such that the value 111111 will remain in the Parity Register. During phase 2 of the memory write cycle, the new word, 010101 stored in Write Data Register 12 will be written into the memory at address, $\alpha$, and simultaneously a high control signal will be applied to control line 32 of the register select network 28 such that the new word will be Exclusively ORed with the contents of the Parity Register and the result will be entered into the Parity Register. Upon completion of the first write operation the contents of the memory and the Parity Register 10 will be as follows:

| ADDRESS | DATA |
|---|---|
| $\alpha$ | 0 1 0 1 0 1 |

-Continued

| ADDRESS | DATA |
|---|---|
| α + 1 | 0 0 0 0 0 0 |
| α + 2 | 0 0 0 0 0 0 |
| α + 3 | 0 0 0 0 0 0 |
| Parity Register | 1 0 1 0 1 0 |

Assume now that the next word to be loaded into the memory at address α + 1 is 111000. Proceeding through the abovementioned steps, at the conclusion of the second write operation the memory and Parity Word Register would contain the following values:

| ADDRESS | DATA |
|---|---|
| α | 0 1 0 1 0 1 |
| α + 1 | 1 1 1 0 0 0 |
| α + 2 | 0 0 0 0 0 0 |
| α + 3 | 0 0 0 0 0 0 |
| Parity Register | 0 1 0 0 1 0 |

Now if it is assumed that on the next two succeeding memory write cycles the words 110011 and 001100 are entered into the memory at addresses α + 2 and α + 3, the condition of the memory and of the Parity Word Register will be as follows:

| ADDRESS | DATA |
|---|---|
| α | 0 1 0 1 0 1 |
| α + 1 | 1 1 1 0 0 0 |
| α + 2 | 1 1 0 0 1 1 |
| α + 3 | 0 0 1 1 0 0 |
| Parity Register | 1 0 1 1 0 1 |

It is to be noted that in each instance, the parity word is such that if added to the entire contents of the memory, the total number of 1 bits in a column (longitudinal) will be odd, assuming that no errors have occurred in the process.

As a final example of the operation of the parity generator network of FIG. 1, let it be assumed that the memory is loaded as illustrated in the immediately foregoing example and that the word stored at address α + 2 is to be replaced with the binary combination 101010. As before, the new word is entered into the Write Data Register 12. During the first phase of the memory write cycle, the old word stored at address α + 2 is read via the sense line 16 and sense amplifiers 18 into the Old Word Register 20. A low control signal is applied to the control line 32 of the register selector network 28 causing this old word (110011) to be Exclusively ORed with the contents of the Parity Register (101101) such that the result 011110 remains in the Parity Register. Next, a high signal is applied to line 32 and the new word to be written (101010) is applied via the register select network 32 to the Exclusive OR gates 30 along with the current contents of the Parity Register 10. As a result, the new parity word 110100 will be entered into the Parity Register 10. At the conclusion of the second phase of the memory write cycle, the memory contents and the content of the Parity Register will be as follows:

| ADDRESS | DATA |
|---|---|
| α | 0 1 0 1 0 1 |
| α + 1 | 1 1 1 0 0 0 |
| α + 2 | 1 0 1 0 1 0 |
| α + 3 | 0 0 1 1 0 0 |
| Parity Register | 1 1 0 1 0 0 |

As before, the word developed in the Parity Register is such that when added on a column-by-column basis to the memory words, will cause the number of 1 bits in each column to be odd. It should also be noted that it makes no difference in what order the new word and the old word are Exclusively ORed in developing the new parity word. That is, the contents of the Write Data Register 12 may first be combined in the Exclusive OR gates with the then current contents of the Parity Register 10 and subsequently, the contents of the Old Word Register 20 may be applied in generating the resultant parity word for the memory as altered by the new word during phase 2 of memory write cycle.

Thus, it can be seen that there is provided by this invention a means whereby the various objects and advantages described herein can be achieved. Since certain modifications and changes may be made in the details of construction of the preferred embodiment disclosed without departing from the spirit of the invention by those of ordinary skill in the art, the scope of invention is to be governed solely by the limitations set forth in the appended claims.

What is claimed is:

1. A circuit for continuously generating a longitudinal parity word each time a new item of data is entered into a computer memory device comprising in combination:

a. a memory for storing digital information at addressable locations therein;

b. A first multistage register connected to said memory for at least temporarily storing a data word to be entered into said memory at a predetermined address;

c. a second multistage register connected to the output of said memory adapted to at least temporarily hold the data word stored in said memory at said predetermined address which is to be replaced with the data word in said first register;

d. a longitudinal parity word register having a number of individual stages equal in number to the size of said data word for storing a binary number representative of the parity word which when added to the words stored in said memory will cause the total number of bits occupying a given bit position in all of said words in said memory to be odd or even;

e. a plurality of Exclusive OR logic circuits equal in number to the number of bits in said data words having first and second input terminals and an output terminal, said output terminal of each of said logic circuits being connected individually to an input of a separate one of said stages of said parity word register;

f. means connecting the output of each of said stages in said parity word register individually to the first of said input terminals of said logic circuit associated with that stage; and g. means for alternately connecting the outputs from the individual stages of said first and second registers to said second terminal of said logic circuit associated with the corresponding stage of said parity word register.

2. Apparatus as in claim 1 wherein said memory operates in a read before write cycle.

3. Apparatus as in claim 1 wherein said last mentioned means comprises a switching network responsive to a control signal for selectively connecting the stages of said first or second registers to an input of the Exclusive OR circuit associated with a corresponding stage of said parity word register.

* * * * *